(12) United States Patent
Chun

(10) Patent No.: US 10,002,528 B2
(45) Date of Patent: Jun. 19, 2018

(54) IR COMMUNICATION METHOD AND ELECTRONIC DEVICE THEREOF

(71) Applicant: Samsung Electronics Co., Ltd., Suwon-si, Gyeonggi-do (KR)

(72) Inventor: Woo-Sung Chun, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 317 days.

(21) Appl. No.: 14/444,192

(22) Filed: Jul. 28, 2014

(65) Prior Publication Data
US 2015/0125154 A1  May 7, 2015

(30) Foreign Application Priority Data
Nov. 4, 2013 (KR) .................. 10-2013-0133023

(51) Int. Cl.
| | |
|---|---|
| H04B 10/40 | (2013.01) |
| H04B 10/11 | (2013.01) |
| G08C 23/04 | (2006.01) |
| H04M 1/725 | (2006.01) |
| H04M 1/737 | (2006.01) |
| H04W 52/02 | (2009.01) |

(52) U.S. Cl.
CPC .......... *G08C 23/04* (2013.01); *H04M 1/7253* (2013.01); *H04M 1/737* (2013.01); *H04W 52/0209* (2013.01); *Y02D 70/00* (2018.01); *Y02D 70/142* (2018.01); *Y02D 70/144* (2018.01); *Y02D 70/164* (2018.01); *Y02D 70/166* (2018.01); *Y02D 70/168* (2018.01); *Y02D 70/26* (2018.01)

(58) Field of Classification Search
CPC .. G08C 23/04; H04W 52/0209; H04M 1/737; H04M 1/7253; Y02D 70/168; Y02D 70/26; Y02D 70/142; Y02D 70/00; Y02D 70/144; Y02D 70/164; Y02D 70/166
USPC .......................... 398/106, 118–131, 135–139
See application file for complete search history.

(56) References Cited

U.S. PATENT DOCUMENTS

| | | | | |
|---|---|---|---|---|
| 5,546,211 A | * | 8/1996 | Devon .................. | H04B 10/114 398/202 |
| 5,617,236 A | * | 4/1997 | Wang .................... | G06F 13/385 398/117 |
| 5,706,110 A | * | 1/1998 | Nykanen ............ | H04B 10/1143 398/35 |
| 6,081,558 A | * | 6/2000 | North ....................... | H03F 3/08 250/214 AG |
| 6,230,277 B1 | * | 5/2001 | Nakaoka ............... | G06F 1/3215 713/310 |
| 6,483,622 B1 | * | 11/2002 | Motohashi ............. | H04B 10/11 398/120 |

(Continued)

FOREIGN PATENT DOCUMENTS

| | | |
|---|---|---|
| EP | 1 868 107 A1 | 12/2007 |
| EP | 2 597 865 A1 | 5/2013 |
| KR | 10-2008-0010859 A | 1/2008 |

*Primary Examiner* — Ken N Vanderpuye
*Assistant Examiner* — Dibson Sanchez
(74) *Attorney, Agent, or Firm* — Jefferson IP Law, LLP

(57) ABSTRACT

A method for operating an electronic device is provided. The method includes converting received infrared into an electrical signal, amplifying the electrical signal and outputting an analog signal, converting the analog signal into digital data, determining whether the digital data is valid, and activating an application program in a freeze state to be in an unfreeze state.

15 Claims, 11 Drawing Sheets

(56) References Cited

U.S. PATENT DOCUMENTS

| | | | | |
|---|---|---|---|---|
| 6,563,618 B1* | 5/2003 | Morrow | H04B 10/1143 | 398/121 |
| 6,810,216 B1* | 10/2004 | Tourunen | H04B 10/40 | 398/135 |
| 7,221,285 B1* | 5/2007 | Hamilton | H04B 10/1143 | 398/105 |
| 8,041,227 B2* | 10/2011 | Holcombe | H04B 10/1143 | 398/115 |
| 9,317,105 B2* | 4/2016 | Chueh | G06F 1/329 | |
| 2001/0035994 A1* | 11/2001 | Agazzi | H03M 1/0604 | 398/135 |
| 2002/0065868 A1* | 5/2002 | Lunsford | H04L 12/5692 | 709/200 |
| 2002/0099966 A1* | 7/2002 | Cabler | H04L 12/12 | 713/323 |
| 2003/0118132 A1* | 6/2003 | Williams | H04L 7/0054 | 375/343 |
| 2004/0192272 A1* | 9/2004 | Seo | H04M 1/72522 | 455/414.1 |
| 2004/0213576 A1* | 10/2004 | Tan | H04B 10/1143 | 398/140 |
| 2005/0070265 A1* | 3/2005 | Korpinen | H04M 3/42 | 455/419 |
| 2005/0086640 A1* | 4/2005 | Kolehmainen | G06F 9/445 | 717/120 |
| 2005/0117912 A1* | 6/2005 | Patterson | H04B 10/114 | 398/135 |
| 2006/0029389 A1* | 2/2006 | Cleary | H04B 10/806 | 398/33 |
| 2006/0034611 A1* | 2/2006 | Li | H04B 10/1143 | 398/135 |
| 2007/0004463 A1* | 1/2007 | Clark | G06F 3/16 | 455/569.1 |
| 2010/0022233 A1* | 1/2010 | Jung | H04M 3/42 | 455/419 |
| 2010/0217852 A1* | 8/2010 | Nishida | H04M 1/72597 | 709/223 |
| 2010/0273450 A1* | 10/2010 | Papineau | G06F 8/60 | 455/411 |
| 2010/0298033 A1* | 11/2010 | Lee | G06F 1/1616 | 455/566 |
| 2011/0083111 A1* | 4/2011 | Forutanpour | G06F 1/1694 | 715/863 |
| 2012/0176955 A1* | 7/2012 | Ishii | H04W 72/042 | 370/315 |
| 2012/0178496 A1* | 7/2012 | Hwang | H04W 52/0264 | 455/550.1 |
| 2012/0214417 A1* | 8/2012 | Woo | G06F 1/3209 | 455/41.2 |
| 2013/0210418 A1* | 8/2013 | Cannon | H04W 4/001 | 455/420 |
| 2013/0238915 A1* | 9/2013 | Kashikar | H04W 52/0245 | 713/320 |
| 2014/0051505 A1* | 2/2014 | Wickramasuriya | A63F 13/12 | 709/201 |
| 2014/0075438 A1* | 3/2014 | He | H04L 67/08 | 718/1 |
| 2014/0359167 A1* | 12/2014 | Balasubramanian | H04L 29/06095 | 709/250 |
| 2015/0074432 A1* | 3/2015 | Winter | G06F 1/3209 | 713/300 |
| 2015/0106656 A1* | 4/2015 | Bian | G06F 9/445 | 714/37 |
| 2016/0048675 A1* | 2/2016 | Chai | H04L 12/6418 | 726/22 |

* cited by examiner

Terminal Information

| device type |
| --- |
| manufacturer |
| version(H/W, S/W) |
| device id |
| error detection/correction |
| backhaul type(wifi,BT,infrared..) |
| ⋮ |

FIG.9

IR COMMUNICATION METHOD AND ELECTRONIC DEVICE THEREOF

CROSS-REFERENCE TO RELATED APPLICATION(S)

This application claims the benefit under 35 U.S.C. § 119(a) of a Korean patent application filed on Nov. 4, 2013 in the Korean Intellectual Property Office and assigned Serial number 10-2013-0133023, the entire disclosure of which is hereby incorporated by reference.

TECHNICAL FIELD

The present disclosure relates to an Infrared (IR) communication method and an electronic device thereof.

BACKGROUND

Infrared (IR) communication technology is widely used for a remote controller for controlling home appliances, such as a TV, a stereo, or an air conditioner, in a wireless manner. For example, in order to facilitate IR communication between a remote controller and a TV, an IR Transmission (Tx) module is mounted in the front portion of a TV remote controller and an IR Reception (Rx) module is mounted in a TV box.

With the development of the IR communication technology, a smart phone may be used for a remote controller and may transmit data to computer peripherals, such as printer, using IR communication. The IR communication technology has developed into Infrared Data Association (IrDA) technology. The IrDA technology is one of short-range wireless communication technologies of directionally transmitting information in a wireless manner using infrared.

According to the IrDA-1.1 standard, the maximum data size that may be transmitted is 2048 bytes and the maximum transmission rate is 4 Mbps. For bidirectional communication using the IrDA technology, transmitter-side and receiver-side electronic devices each need to include IR transmission/reception modules and a software application program is required in order to perform synchronization for communication.

FIGS. 1A and 1B are diagrams illustrating bidirectional IR communication states between electronic devices according to the related art.

Referring to FIGS. 1A and 1B, a first terminal and a second terminal each have IR Tx/Rx modules (not illustrated) and perform a pairing process in a state in which the terminals (e.g., the IR TX module and the IR RX module of the respective terminals) face each other for IR communication to perform IR communication.

As example, a terminal may correspond to various types of electronic devices, such as smart phone or tablet PC.

FIG. 2 illustrates a bidirectional IR communication process between electronic devices according to the related art.

Referring to FIG. 2, a first terminal 201 and a second terminal 203 are in IR communication.

At operation 205, the first terminal 201 generates a first request signal (Request #1) inquiring about identification of the second terminal 203 and transmits the first request signal using infrared.

At operation 207, the second terminal 203 generates a first response signal (Response #1) responding about identification of the second terminal 203. The response to the first request signal (Response #1) includes identification information of the second terminal 203. The second terminal 203 transmits the first response signal using infrared.

Thereafter, at operations 209, 211, and 213, the first terminal 201 and the second terminal 203 undergo a pairing process. For example, during the pairing process, at operation 209, a request signal (Request #n) is transmitted. At operation 211, a response signal (Response #n) is transmitted. The request signal and the response signal are transmitted and received n times through a plurality of steps and share various information through IR communication. At operation 213, the second terminal 203 pairs with the first terminal 201.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an Infrared (IR) communication method for an electronic device and the electronic device which immediately and effectively perform bidirectional ID communication with an electronic device, such as smart phone or tablet PC, which is in a sleep mode by a user's simple manipulation.

In accordance with an aspect of the present disclosure, a method for operating an electronic devices provided. The method includes converting received infrared into an electrical signal, amplifying the electrical signal and outputting an analog signal, converting the analog signal into digital data, determining whether the digital data is valid, and activating an application program in a freeze state to be in an unfreeze state.

In accordance with another aspect of the present disclosure, an electronic device is provided. The electronic device includes a receiver configured to receive infrared and to perform conversion into an electrical signal, an analog processor to amplify the electrical signal and to output an analog signal, and a digital processor to convert the analog signal into digital data, to determine whether the digital data is valid, and to activate an application program in a freeze state to be in an unfreeze state.

In accordance with another aspect of the present disclosure, a method for communication between an electronic device and a counterpart electronic device using infrared is provided. The method includes transmitting, by the electronic device, a pairing request to the counterpart electronic device, receiving, by the counterpart electronic device, the pairing request, determining, by the counterpart electronic device, whether data included in the pairing request corresponds to valid data, activating, by the counterpart electronic device, an application program in response to the data included in the pairing request being determined to be valid, and initiating pairing between the electronic device and the counterpart electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 9 is a diagram illustrating information for a transmitter-side electronic device according to an embodiment of the present disclosure;

Throughout the drawings, it should be noted that like reference numbers are used to depict the same or similar elements, features, and structures.

DETAILED DESCRIPTION

Figure 1A:
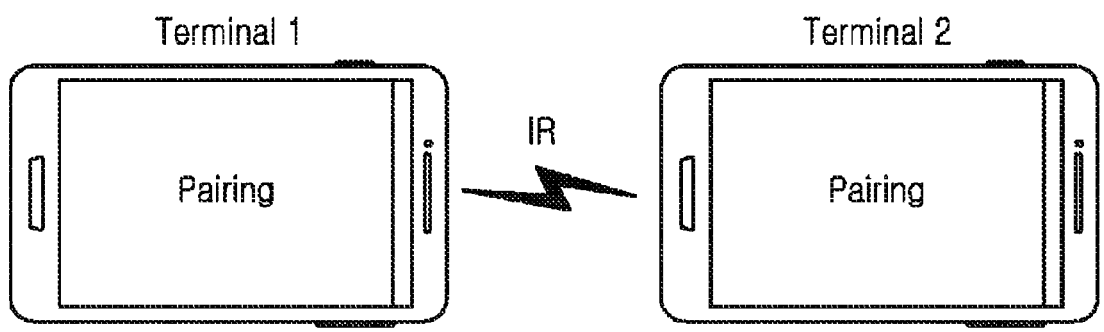
FIGS. 1A and 1B are diagrams illustrating Infrared (IR) communication states between electronic devices according to the related art.
Figure 1B:
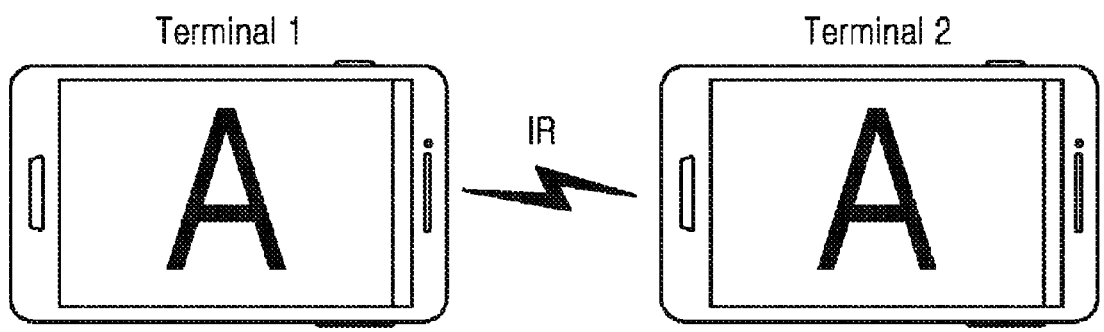
Figure 2:
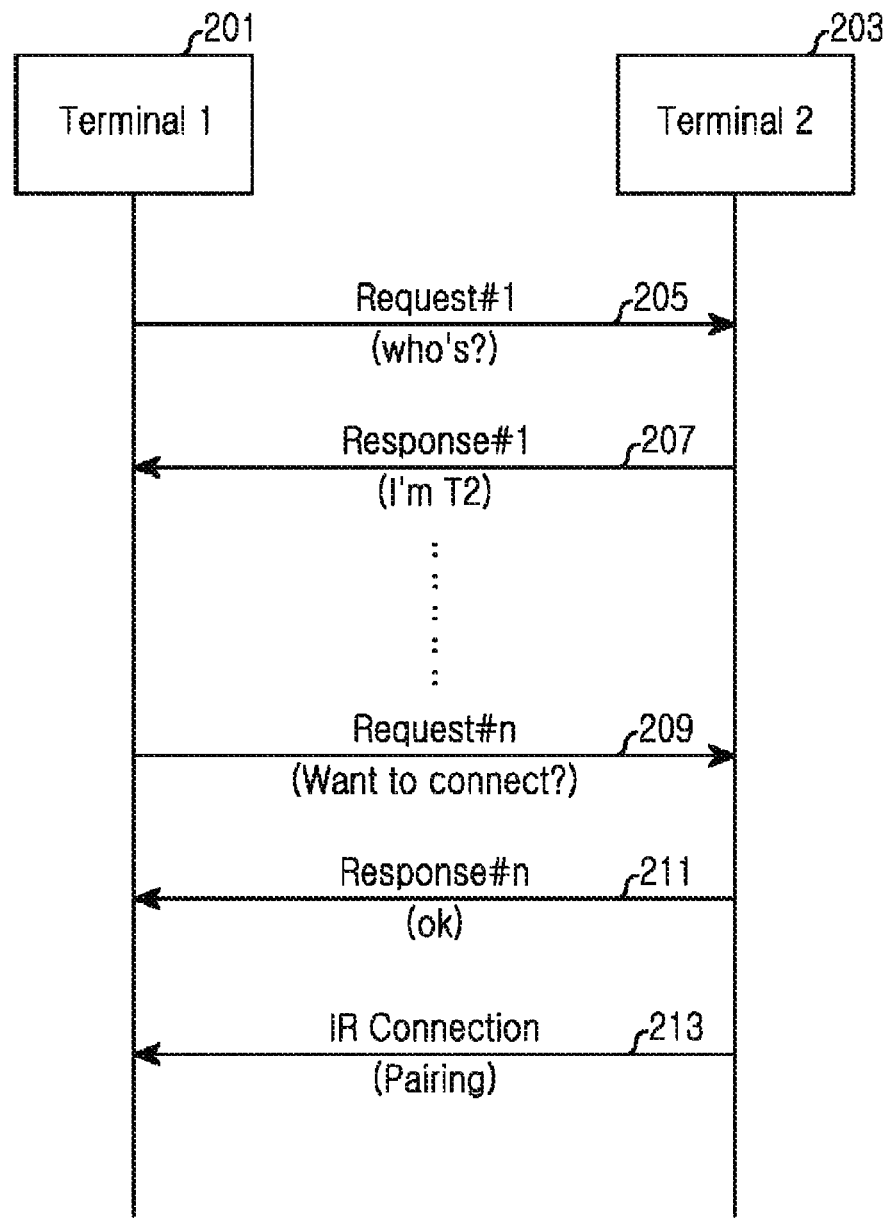
FIG. 2 is a diagram illustrating an IR communication process between electronic devices according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The electronic device according to various embodiments of the present disclosure may be a device having a communication function. For example, the electronic device may be one or a combination of a smart phone, a tablet Personal Computer (PC), a mobile phone, a video phone, an electronic-book reader, a desktop PC, a laptop PC, a netbook computer, a Personal Digital Assistant (PDA), an MP3 player, a mobile medical equipment, an electronic bangle, an electronic necklace, an electronic appcessory, a camera, a wearable device, an electronic clock, a watch, smart appliances (e.g., a refrigerator, an air-conditioner, a cleaner, an intelligent robot, a television, a DVD player, a stereo, an oven, a microwave oven, a washing machine, an air cleaner, and a digital photo frame), various types of medical equipments (e.g., Magnetic Resonance Angiography (MRA), Magnetic Resonance Imaging (MRI), Computed Tomography (CT), an imaging device, or an ultrasonic imaging device), a navigation device, a Global Positioning System (GPS) receiver, an Event Data Recorder (EDR), a Flight Data Recorder (FDR), a set-top box, a TV box (e.g., Samsung HomeSync™, Apple TV™, or Google TV™), an electronic dictionary, a vehicle infotainment device, a ship electronic equipment (e.g., a ship navigation device, a gyro-compass device, a compass), an avionics device, a security equipment, an electronic clothing, an electronic key, a camcorder, a game console, a Head-Mounted Display (HMD) a flat display device, an electronic album, a furniture or a portion of a building/structure including a communication function, an electronic board, an electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

Figure 3:
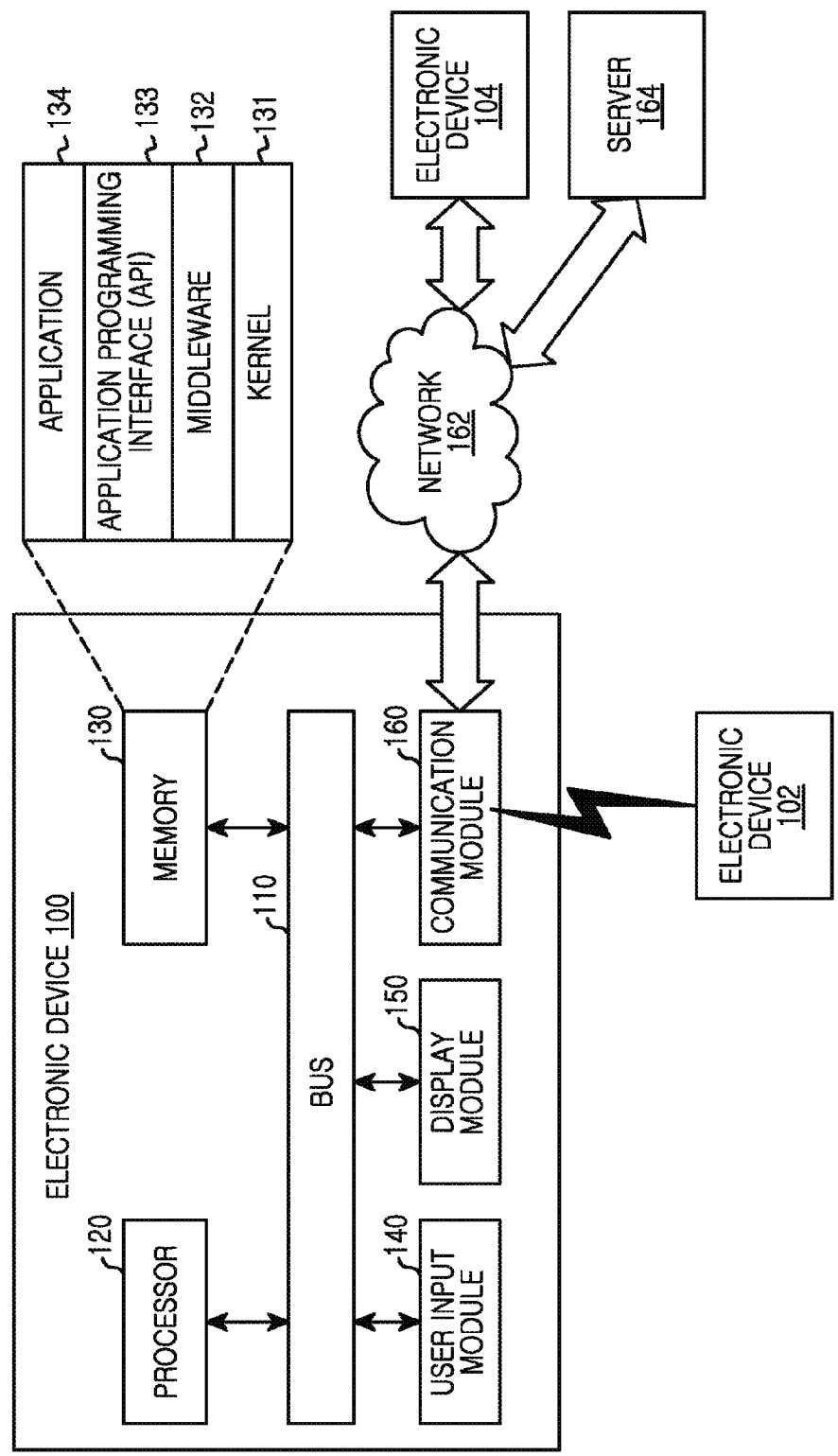
FIG. 3 is a block configuration of an electronic device according to an embodiment of the present disclosure.

FIG. 3 is a diagram illustrating a block configuration of an electronic device according to an embodiment of the present disclosure.

Referring to FIG. 3, the electronic device 100 may include a bus 110, a processor 120, a memory 130, a user input module 140, a display module 150, and a communication module 160.

The bus 110 may be a circuit for connecting the above-described components to one another and transferring communication (e.g., a control message) between the above-described components.

The processor 120 may receive an instruction from the above-described component (e.g., the memory 130, the user input module 140, the display module 150, or the communication module 160) through, for example, the bus 110, decode the received instruction, and perform data operations or data processing according to the decoded instruction.

The memory 130 may store an instruction or data that is received from or generated by the processor 120 or another component (e.g., the user input module 140, the display module 150, the communication module 160, and/or the like).

The memory 130 may include programming modules, such as a kernel 131, middleware 132, an Application Programming Interface (API) 133, an application 134, and/or the like. The above-described programming modules may be respectively configured by software, firmware, hardware or any combination of at least two thereof.

The kernel 131 may control or manage system resources (e.g., the bus 110, the processor 120, or the memory 130) used to perform an operation or function implemented by another remaining programming module, for example, the middleware 132, the API 133, the application 134, and/or the like. The kernel 131 may provide an interface for allowing the middleware 132, the API 133, the application 134, and/or the like to access and control or manage respective components of the electronic device.

The middleware 132 may perform a relay function such that the API 133 or the application 134 communicates with the kernel 131 for transmission and reception of data. In addition, the middleware 132 may perform load balancing of transaction requests received from a plurality of applications 134 in such a way that a priority of using the system resources (e.g., the bus 110, the processor 120, or the memory 130) of the electronic device 100 is assigned to at least one application of the plurality of applications 134 according to the transaction requests.

The API 133 may be an interface for enabling the applications 134 to control functions provided by the kernel 131 or the middleware 132 and includes, for example, at least one interface or function for file control, window control, image processing, or character control.

The user input module 140 may receive an instruction or data from, for example, a user and transfer the instruction or data to the processor 120 or the memory 130 through the bus 10. The display module 150 may display an image, moving images or data to the user. The user input module 140 may be configured as a touch screen. The user input module 140 may include one or more keys, buttons, or the like.

The communication module 160 may perform communication between another electronic device 102 and the electronic device 100 and support a predetermined short-range communication protocol (e.g., WiFi, Blue Tooth (BT), Near-Field Communication (NFC), or a predetermined network communication 162 (e.g., Internet, Local Area Network (LAN), Wire Area Network (WAN), telecommunication network, cellular network, satellite network or Plain Old Telephone Service (POTS), and/or the like). The electronic devices 102 and 104 may be a device identical to (e.g., the same type as or different from (e.g., the different type from) the electronic device 100 respectively. The electronic device 100 may communicate with a server 164 using the communication module 160.

Figure 4:
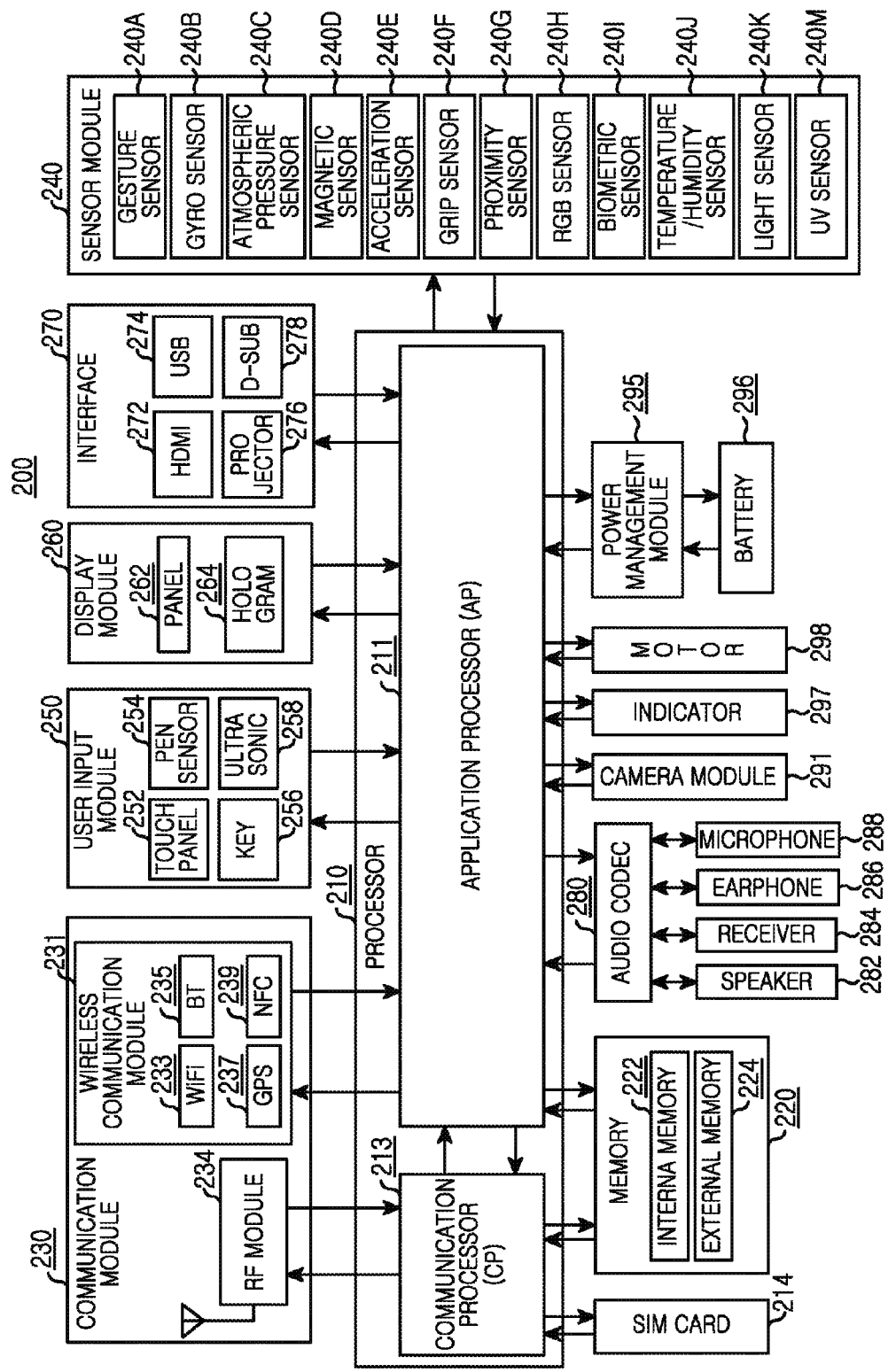
FIG. 4 is a block diagram of hardware according to an embodiment of the present disclosure.

FIG. 4 is a block diagram of hardware according to an embodiment of the present disclosure. The hardware 200 may be, for example, the electronic device 100 illustrated in FIG. 3.

Referring to FIG. 4, the hardware 200 may include at least one processor 210, a Subscriber Identification Module (SIM) card 214, a memory 220, a communication module 230, a sensor module 240, a user input module 250, a display module 260, an interface 270, an audio codec 280, a camera module 291, a power management module 295, a battery 296, an indicator 297, or a motor 298.

The processor 210 (e.g., the processor 120 illustrated in FIG. 3) may include at least one Application Processor (AP) 211 and/or at least one Communication Processor (CP) 213. The processor 210 may be, for example, the processor 120 illustrated in FIG. 3. Although the AP 211 and the CP 213 are illustrated as being included in the processor 210 in FIG. 4, the AP 211 and the CP 212 may be respectively included in different IC packages. According to various embodiments of the present disclosure, the AP 211 and the CP 213 may be included in one IC package.

The AP 211 may execute an operating system or application programs to control a plurality of hardware or software components and perform data processing and data operations on various kinds of data including multimedia data. The AP 211 may be implemented by, for example, a System on Chip (SoC). According to various embodiments of the present disclosure, the processor 210 may further include a Graphic Processing Unit (GPU) (not illustrated). The CP 213 may perform a function of managing data links for communication between an electronic device (e.g., the electronic device 100) including the hardware 200 and other electronic devices connected to the electronic device through networks and converting communication protocols. The CP 213 may be implemented by, for example, a SoC.

According to various embodiments of the present disclosure, the CP 213 may perform at least one of multimedia control functions. The CP 213 may perform terminal identification and authentication using, for example, a subscriber identification module (e.g., the SIM card 214) within a communication network. In addition, the CP 213 may provide services, such as a voice call, a video call, a text message, packet data, and/or the like to a user. In addition, the CP 213 may control the data transmission and reception of the communication module 230. Although the components, such as the CP 213, the power management module 295, the memory 220, and/or the like are illustrated as being provided separately from the AP 211 in FIG. 4, the AP 211 may be implemented to include at least one (e.g., the CP 213) of the above-described components according to various embodiments of the present disclosure.

According to various embodiments of the present disclosure, the AP 211 and the CP 213 may load an instruction or data received from a nonvolatile memory or another component connected to the AP 211 or the CP 213 into a volatile memory for processing. In addition, the AP 211 or the CP 213 may store data received from or generated by at least one of other components in the nonvolatile memory. The SIM card 214 may be a card implementing a subscriber identity module or may be inserted into a slot formed in a specific location of the electronic device. The SIM card 214 may include unique identification information (e.g., Integrated Circuit Card IDentifier (ICCID)) subscriber information (e.g., International Mobile Subscriber Identity (IMSI)), and/or the like.

The memory 220 may include an internal memory 222 or an external memory 224. The memory 220 may be, for example, the memory 130 illustrated in FIG. 3. The internal memory 222 may include at least one of a volatile memory (e.g., Dynamic Random-Access Memory (DRAM), Static Random-Access Memory (SRAM), Synchronous Dynamic Random-Access Memory (SDRAM), and/or the like) or a nonvolatile memory (e.g., One-Time Programmable Read Only Memory (OTPROM), Programmable Read Only Memory (PROM), Erasable Programmable Read Only Memory (EPROM), Electrically Erasable Programmable Read Only Memory (EEPROM), mask ROM, flash ROM, NAND flash memory, NOR flash memory, and/or the like). According to various embodiments of the present disclosure, the internal memory 222 may have a Solid State Drive (SSD) type. The external memory 224 may further include, for example, a Compact Flash (CF) card, a Secure Digital (SD) card, a Micro Secure Digital (Micro-SD) card, a Mini Secure Digital (Mini-SD) card, an extreme Digital (xD) card, a memory stick, and/or the like.

The communication module 230 may include a wireless communication module 231 or an RF module 234. The communication module 230 may be, for example, the communication module 160 illustrated in FIG. 3. The wireless communication module 231 may include, for example, a WiFi module 233, a Bluetooth (BT) module 235, GPS 237 or a NFC module 239. For example, the wireless communication module 231 may provide a wireless communication function by using radio frequencies. The wireless communication module 231 may include an IR module (e.g., that communicates using Infrared Data Association (IrDA) technology). Additionally, or alternatively, the wireless communication module 231 may include a network interface (e.g., LAN card) or a modem which connects the hardware 200 to a network (e.g., Internet, LAN, WAN, telecommunication network, cellular network, satellite network or POTS, and/or the like).

The RF module 234 may perform transmission and reception of data, for example, transmission and reception of RF signals or requested electronic signals. Although not illustrated, the RF module 234 may include, for example, a transceiver, a Power Amp Module (PAM), a frequency filter, or a Low Noise Amplifier (LNA), and/or the like. The RF module 234 may further include a component for transmitting and receiving electromagnetic waves in free space for wireless communication, for example, a conductor or a conductive line.

The sensor module 240 may include at least one of, for example, a gesture sensor 240A, a gyro sensor 220B, a barometer 240C, a magnetic sensor 240D, an acceleration sensor 240E, a grip sensor 240F, a proximity sensor 240G, a Red-Green-Blue (RGB) sensor 240H, a biophysical sensor 240I, a temperature/humidity sensor 240J, a illumination sensor 240K, an Ultra Violet (UV) sensor 240M, and/or the like. The sensor module 240 may measure a physical amount or detect the operation state of the electronic device and convert measured or detected information into an electrical signal.

Additionally or alternatively, the sensor module 240 may include, for example, an E-nose sensor (not illustrated), an ElectroMyoGraphy (EMG) sensor (not illustrated), an ElectroEncephaloGram (EEG) sensor, (not illustrated), an ElectroCardioGram (ECG) sensor (not illustrated), a fingerprint sensor, and/or the like. The sensor module 240 may further include a control circuit for controlling at least one sensor included therein. The user input module 250 may include a touch panel 252, a (digital) pen sensor 254, a key 256, or an ultrasonic input device 258. The user input module 250 may be, for example, the user input module 140 illustrated in FIG. 3. The touch panel 252 may recognize a touch input using at least one method of, for example, a capacitive method, a pressure-sensitive method, an IR method, an ultrasonic method, and/or the like.

In addition, the touch panel 252 may further include a controller (not illustrated). In the case of the capacitive method, the touch panel 252 may detect a direct touch and a proximity event (e.g., proximity recognition is possible with a touch panel 252 using a capacitive recognition method). The touch panel 252 may further include a tactile layer. In this case, the touch panel 252 may provide a tactile response to a user. The (digital) pen sensor 254 may be implemented by using, for example, a method identical or similar to a method for receiving a touch input or a separate recognition sheet. For example, a keypad, a touch key, and/or the like may be used as the key 256.

The ultrasonic input device 258 may be a device for detecting a sound wave using a microphone (e.g., the microphone 288) and identifying data in a terminal, through a pen for generating an ultrasonic signal to facilitate wireless recognition. According to various embodiments of the present disclosure, the hardware 200 may receive a user input from an external device (e.g., a network, a computer, a server, and/or the like) connected thereto by using the communication module 230.

The display module 260 may include a panel 262 and a hologram 264. The display module 260 may be, for example, the display module 150 illustrated in FIG. 3. The panel 262 may be, for example, a Liquid Crystal Display (LCD) panel an Active Matrix Organic Light-Emitting Diode (AM-OLED) panel, and/or the like. The panel 262 may be implemented to be, for example, flexible, transparent, or wearable.

The panel 262 may be formed as one module with the touch panel 252. The hologram 264 may enable a 3D image to be viewed in space using optical interference. According to various embodiments of the present disclosure, the display module 260 may further include a control circuit for the panel 262 and the hologram 264.

The interface 270 may include, for example, a HDMI 272, an USB 274, a projector 276, or a D-sub 278. Additionally or alternatively, the interface 270 may include, for example, a Secure Digital (SD)/Multi-Media Card (MMC) interface (not illustrated) an Infrared Data Association (IrDA) interface (not illustrated), and/or the like.

The audio codec 280 may perform conversion between voice and electrical signals. The audio codec 280 may perform conversion of voice information input or output through, for example, a speaker 282, a receiver 284, an earphone 286, a microphone 288, and/or the like.

The camera module 291 may be a device for capturing an image and moving images. According to an embodiment of the present disclosure, the camera module 191 may include at least one image sensor (e.g., a front lens or a rear lens), an image signal processor (not illustrated), or a flash LED (not illustrated).

The power management module 295 may manage power of the hardware 200. Although not illustrated, the power management module 295 may include, for example, a Power Management IC (PMIC), a charger IC, a battery gage, and/or the like. The PMIC may be mounted within, for example, an integrated circuit or a SoC semiconductor. A charging method may include a wired charging method and a wireless charging method. The charger IC may charge a battery and prevent the application of overvoltage or over-current from a charger. According to various embodiments of the present disclosure, the charger IC may include a charger IC employing at least one of a wired charging method or a wireless charging method. The wireless charging method may include, for example, a magnetic resonance method, a magnetic induction method, or an electromagnetic wave method. For example, an additional circuit for wireless charging, for example, a coil loop, a resonance circuit, or a rectifier may be included.

A battery gage may measure, for example, an amount of power remaining or a voltage, a current, or a temperature during charging with respect to the battery 296. The battery 296 may generate electricity and supply power and may be, for example, a rechargeable battery.

The indicator 297 may represent a specific state of the hardware 200 or a component thereof (e.g., the AP 211), for example, a booting state, a message state, a charge state, and/or the like.

The motor 298 may convert an electrical signal into mechanical vibration.

The MCU 299 may control the sensor module 240.

Although not illustrated, the hardware 200 may include a processing device (e.g., a Graphical Processing Unit (GPU)) for supporting a mobile TV. The processing device for supporting a mobile TV may process media data based on, for example, Digital Media Broadcast (DMB), Digital Video Broadcasting (DVB) or Media Flo™. The names of the above-described components of the hardware according to various embodiments of the present disclosure may vary according to the types of the electronic device. The hardware according to various embodiments of the present disclosure may be configured by including at least one of the above-described components. Some components may be omitted from, or additional other components may be further included in the hardware. When some of the components of the hardware according to various embodiments of the present disclosure are combined into one entity, the one entity may perform the functions of the components before combination.

Figure 5:
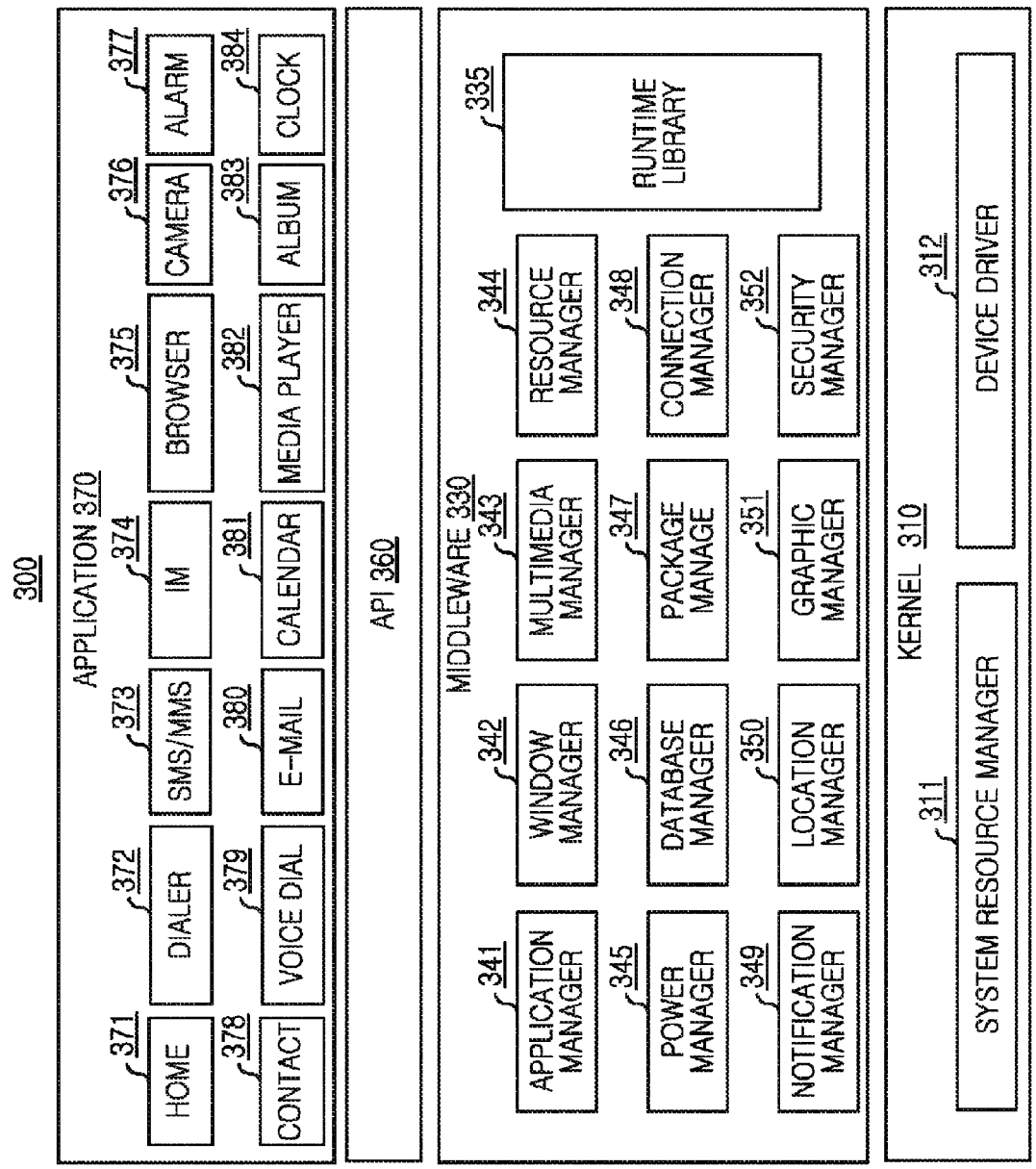
FIG. 5 is a block diagram of a programming module according to an embodiment of the present disclosure.

FIG. 5 is a block diagram of a programming module according to an embodiment of the present disclosure.

Referring to FIG. 5, the electronic device may include a programming module 300. For example, the programming module 300 may be included (e.g., stored) in the electronic device 100 (e.g., the memory 130) illustrated in FIG. 3. At least one component of the programming module 300 may be configured by software, firmware, hardware, or a combination of at least two thereof. The programming module 300 may be implemented in hardware (e.g., the hardware 200) and may include an electronic device (e.g., an Operating System (OS) that controls resources associated with the electronic device 100 or various applications (e.g., the applications 370 running on the operating system).

For example, the operating system may be Android, iOS, Windows, Symbian, Tizen, or Bada. Referring to FIG. 5, the programming module 300 may include a kernel 310, middleware 330, an application programming interface 360, or applications 370.

The kernel 310 (e.g., the kernel 131) may include a system resource manager 311, a device driver 312, and/or the like. The system resource manager 311 may include, for example, a process management unit (not shown), a memory management unit (not shown), a file system management unit (not shown), and/or the like. The system resource manager 311 may perform control, allocation or de-allocation of system resources. The device driver 312 may include, for example, a display driver (not shown), a camera driver (not shown), a Bluetooth driver (not shown), a shared memory driver (not shown), an USB driver (not shown), a keypad driver (not shown), a WiFi driver (not shown), an audio driver (not shown), and/or the like.

According to various embodiments of the present disclosure, the device driver 312 may include an Inter-Process Communication (IPC) driver (not illustrated).

The middleware 330 may include a plurality of modules which are implemented in advance in order to provide functions needed by the applications 370 in common. In addition, the middleware 330 may provide functions through the API 360 such that the applications 370 efficiently use limited system resources within the electronic device.

For example, as illustrated in FIG. 5, the middleware 330 (e.g., the middleware 132 illustrated in FIG. 3) may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, or a security manager 352.

The runtime library 335 may include a library module to be used by a compiler in order to provide a new function through programming language during execution of the applications 370. According to various embodiments of the present disclosure, the runtime library 335 may perform functions for input/output, memory management, arithmetic functions, and/or the like.

The application manager 341 may manage, for example, a life cycle of at least one application of the applications 370.

The window manager 342 may manage Graphical User Interface (GUI) resources used for a screen.

The multimedia manager 343 may identify formats required for playback of various media files and perform encoding and decoding on media files by using codecs suitable for the formats.

The resource manager 344 may manage resources, such as source codes, memory, storage space, and/or the like for at least one application of the applications 370.

The power manager 345 may manage a battery or power in cooperation with BIOS and provide power information needed for operation.

The database manager 346 may manage the generation, search or modification of a database to be used by at least one application of the applications 370.

The package manager 347 may manage installation and update of an application provided in the form of a package file.

The connection manager 348 may manage wireless connection for WiFi, Bluetooth, and/or the like.

The notification manager 349 may display or notify an event, such as message arrival, a promise, proximity, an alarm to a user in the form of not disturbing the user.

The location manager 350 may manage location information of the electronic device.

The graphic manager 351 may manage graphic effects to be provided to the user or a relevant user interface.

The security manager 352 may provide various security functions required for system security and user authentication.

According to various embodiments of the present disclosure, if the electronic device (e.g., electronic device 100) has a telephone function, the middleware 330 may further include a telephony manager for management of a voice and video call function of the electronic device.

The middleware 330 may generate and use a new middleware through various function combinations of the above-described component modules. The middleware 330 may provide specialized modules for respective operating system types in order to a special function. In addition, the middleware 330 may dynamically delete some of existing components or add new components. Accordingly, some of components provided in various embodiments of the present disclosure may be omitted or other components may be further provided. In addition, a component for performing a similar function may be substituted.

The API 360 (e.g., the API 133 of FIG. 3) may be a set of API programming functions and another API having a different configuration may be provided according to operating systems. For example, in the case of Android or IOS, one API set may be provided for each platform. In the case of Tizen, two or more API sets may be provided. The applications 370 (e.g., the application 134) may include a preloaded application or a third party application.

According to various embodiments of the present disclosure, the electronic device may have one or more applications stored thereon. For example, the applications 370 may include a home application 371, a dialer application 372, a messaging application (e.g., Short Message Service, Multimedia Message Service, and/or the like) 373, an instant messaging application 374, a browser application 375, a camera application 376, an alarm application 377, a contact application 378, a voice dial application 379, an email application 380, a calendar application 381, a media player application 382, an album application 383, a clock application 384, and/or the like.

The programming module 300 may be at least partially implemented by instructions stored in a non-transitory storage medium readable by a computer. When the instructions are executed by at least one processor (e.g., the processor 210 of FIG. 4), the at least one processor may perform a function corresponding to the instructions. The non-transitory storage medium readable by a computer may be, for example, the memory 260. The programming module 300 may be at least partially implemented (e.g., executed) by, for example, the processor 210.

The programming module 300 may at least partially include a module, a routine, a set of instructions or a process for performing at least one function. The names of components of the programming module (e.g., the programming module 300) according to various embodiments of the present disclosure may be changed according to operating systems. In addition, the programming module according to various embodiments of the present disclosure may include at least one of the above-described components. Some of the components may be omitted from the programming module or other additional components may be further included in the programming module.

The operational principle of various embodiments of the present disclosure will be described herein below with reference to the accompanying drawings. In the following description, detailed descriptions of well-known functions or configurations will be omitted because such detailed descriptions may unnecessarily obscure the subject matters of the present disclosure. Furthermore, terms to be described below have been defined by considering functions in various embodiments of the present disclosure, and may be defined differently depending on a user or operator's intention or practice. Therefore, the terms used herein should be understood based on the descriptions made herein.

An IR communication method in an electronic device and the electronic device according to various embodiments of the present disclosure will be described in detail below. The electronic device according to various embodiments of the present disclosure may be configured by including the components illustrated in FIG. 5 and the communication module 230 of the electronic device may further include an IR module.

Figure 6:
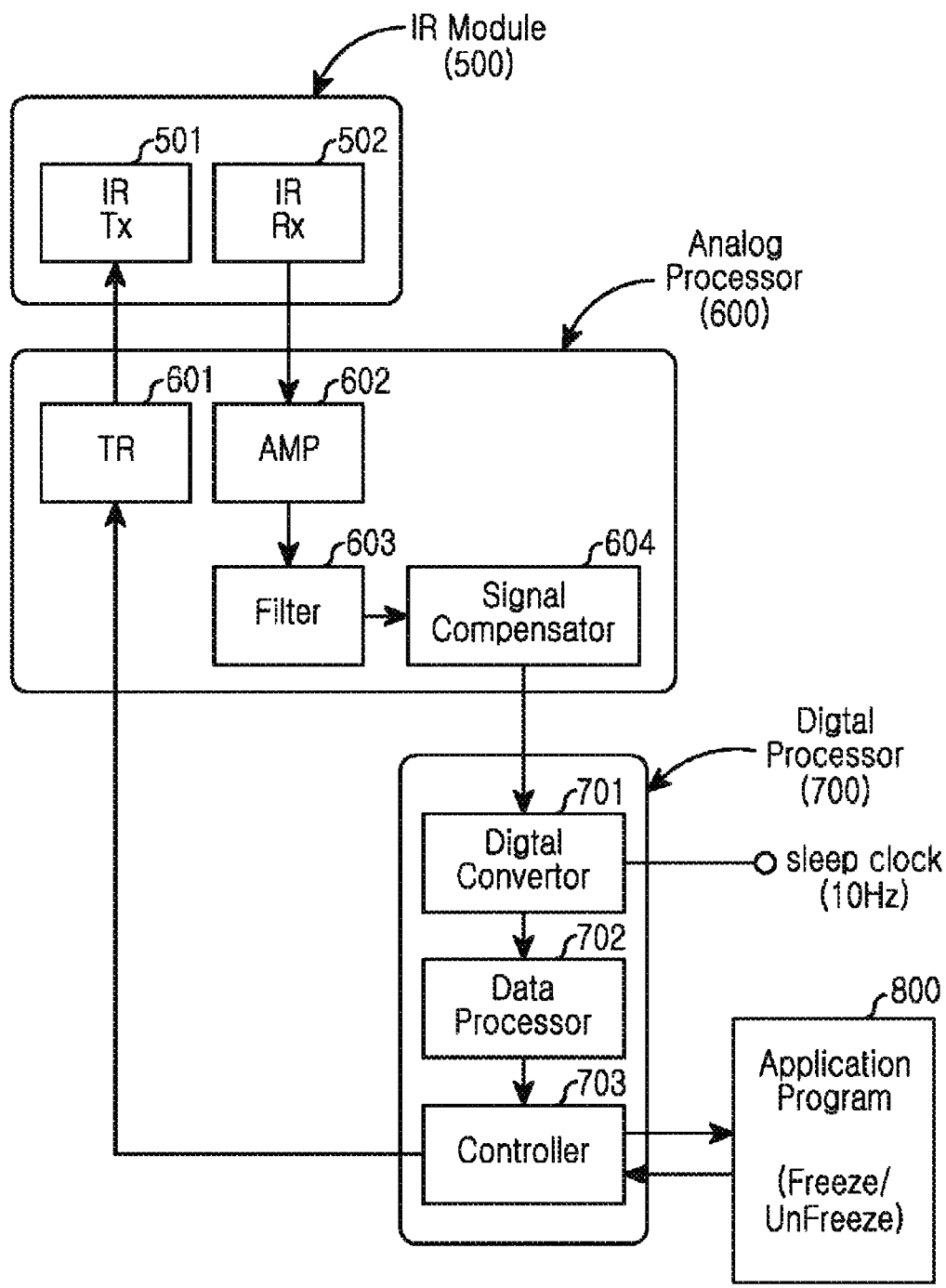
FIG. 6 is a diagram illustrating a detailed configuration of an electronic device according to an embodiment of the present disclosure.

FIG. 6 is a diagram illustrating a detailed configuration of an electronic device according to an embodiment of the present disclosure.

Referring to FIG. 6, an electronic device, such as a smart phone a tablet PC, or the like may include a IR module 500, an analog processor 600, a digital processor 700, and an application program 800 which is in a freeze state for power saving in a sleep mode.

The freeze state refers to an idle state which an application program enters for power saving, whereas an unfreeze state refers to an activity state in which the sleep mode is released and an application program is activated.

The IR module 500 may include an IR transmitter (TX) 501 and an IR receiver (RX) 502. The IR module 500 may include an IR LED for an IR transmitter 501 for transmitting infrared and a Photo Detector (PD) as an IR receiver 502 for receiving infrared. The IR LED and the PD may be manufactured as one package. Furthermore, the package may include two or more PDs arranged in parallel in order to improve infrared reception sensitivity.

The analog processor 600 may include a TRansistor (TR) 601, an AMPlifier (AMP) 602, a filter 603, and a signal compensator 604. The TR 601 may be a switching element for converting an electrical signal which is input to the IR LED into a rectangular pulse signal, and may be included in the IR module 500 along with the IR LED.

The AMP 602 may be implemented using a preamplifier for amplifying a low-level electrical signal output from the PD to have a predetermined or more level of voltage. The electrical signal output from the PD may be amplified to have a predetermined or more level of voltage by passing through the AMP 602. The filter 603 may be configured to remove the noise component of the electrical signal amplified by the AMP 602 to have the predetermined or more level of voltage and may be implemented using a band-pass filter.

The signal compensator 604 may compensate for the distortion component of the electrical signal that has passed through the filter 603. For example, the signal compensator 604 compensates for undesired amplitude distortion and phase distortion when the electrical signal passes through the AMP and the filter.

The analog processor 600 may be configured by a driver IC. The filter 603 for removing noise components and the signal compensator 604 for compensating for the distortion components may be omitted in the analog processor 600.

The IR module 500 and the analog processor 600 maintain an operable state in which normal power is continuously supplied thereto even when the electronic device is in a sleep mode.

The digital processor 700 converts the analog signals into digital data and determines whether the digital data is valid data. When the digital data is valid data, the digital processor 700 activates the application program 800 which had been in the freeze state so as to be in the unfreeze state.

The digital processor 700 may ignore (e.g., not respond to) the digital data when the digital data is determined not to be valid data and may maintain the application program in the freeze state. The digital processor 700 may be implemented using a Field Programmable Gate Array (FPGA) IC. The digital processor 700 maintains a standby state in which low power is supplied thereto when the electronic device is in the sleep mode. When the voltage level of the analog signal is equal to or larger than a predetermined level, the digital processor 700 may performs witching to the operable state from the standby state.

The digital processor 700 may include a digital converter 701, a data processor 702, and a controller 703.

The digital converter 701 may convert an analog signal output from the analog processor 600 into digital data. The digital converter 701 may be implemented using an Analog-to-Digital Converter (ADC) and may convert the analog signal into the digital data by using a frequency clock signal (e.g., 10 Hz) for the sleep mode.

The data processor 702 may determine whether the digital data is valid data.

The controller 703 may generate an interrupt signal for activating the application program 800 which had been in the freeze state so as to be in the unfreeze state if the digital data is determined to be valid data. For example, the controller 703 may generate the interrupt signal for activating the application program 800 in response to the digital data being determined to be valid. The controller 703 generates the interrupt signal to activate the application program 800 and, thereafter, transmits the digital data to the application program. The interrupt signal and the digital data transmitted from the controller 703 are sequentially transmitted to the application program 800 at predetermined time intervals or are transmitted in one continuous data stream.

According to various embodiments of the present disclosure, the application program 800 may immediately perform IR communication with a party electronic device that had transmitted infrared in response to the digital data transmitted from the controller 703 after being activated by the interrupt signal or may selectively perform IR communication depending on whether a user accepts the IR communication. According to various embodiments of the present disclosure, the application program 800 may be an IR pairing program for performing bi-directional IR communication with the party electronic device. The data processor 702 and the controller 703 may be integrated into one component or may be included in the processor 210 of the electronic device illustrated in FIG. 4.

Figure 7A:
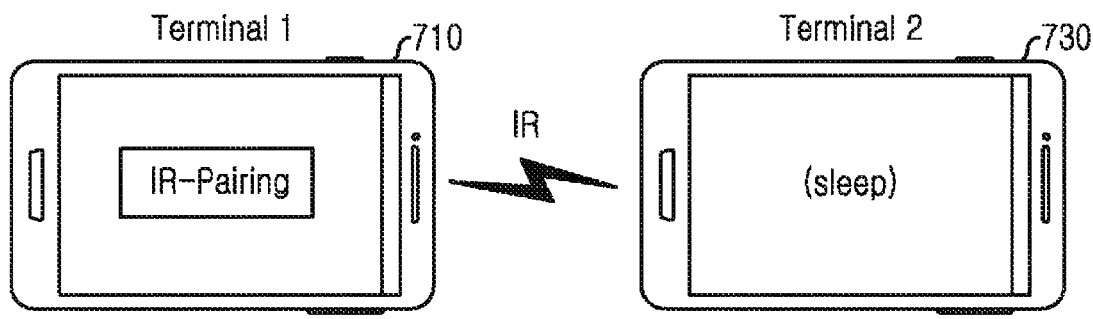
FIGS. 7A and 7B are display screens of an electronic device according to an embodiment of the present disclosure.
Figure 7B:
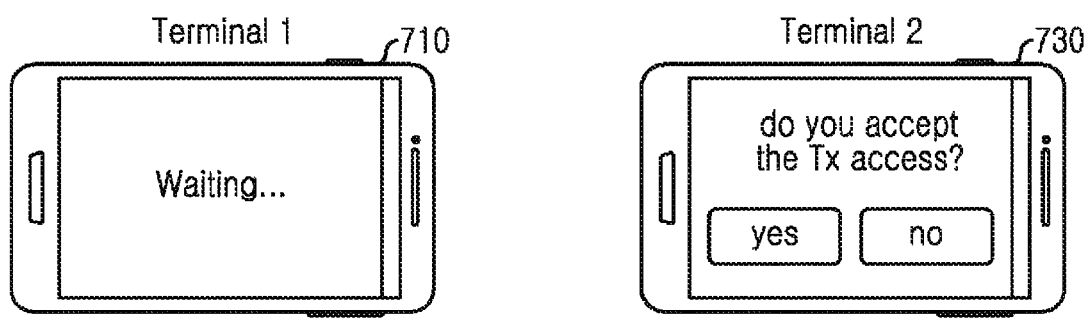

FIGS. 7A and 7B are display screens of an electronic device according to an embodiment of the present disclosure.

Figure 8:
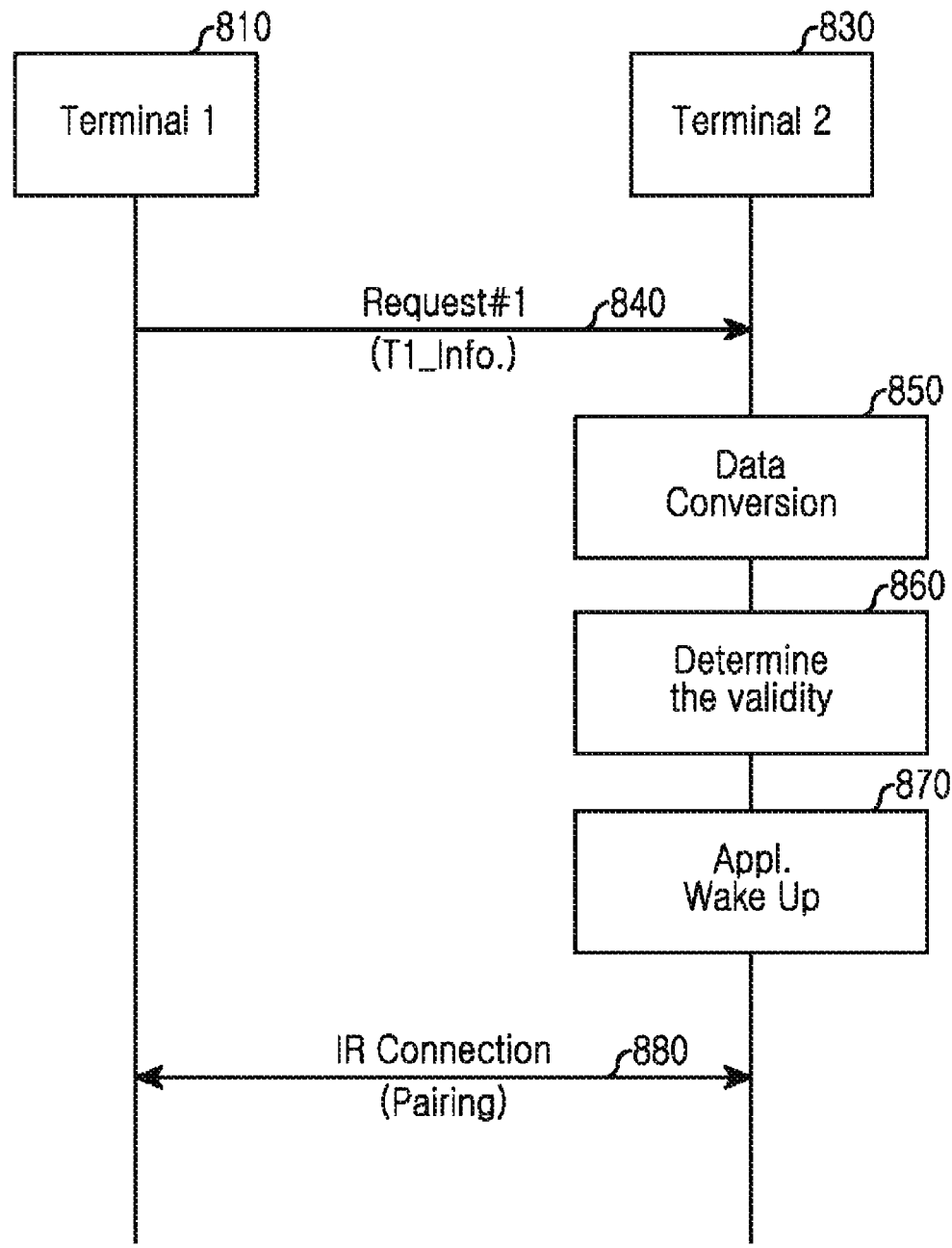
FIG. 8 is a diagram illustrating a IR communication process between electronic devices according to an embodiment of the present disclosure.

FIG. 8 is a diagram illustrating an IR communication process between electronic devices according to an embodiment of the present disclosure.

According to various embodiments of the present disclosure, a terminal may be an electronic device such as a smart phone, a tablet PC, or the like.

Referring to FIG. 7A, a first terminal (Terminal 1) 710 and a second terminal (Terminal 2) 730 each have an IR module (not illustrated) and perform a pairing process in a state in which the first terminal 710 and the second terminal 730 face each other for IR communication to perform IR communication.

For example, the first terminal 710 may be in an operable state, and the second terminal 730 may be in a sleep mode. The first terminal 710 may display an IR-pairing button on a screen according to a user's request and, when the user touches the IR-pairing button (e.g., in response to the user touching the IR-pairing button), the first terminal 710 generates a request signal Request #1 for immediate performance of the IR pairing and transmits the request signal to the second terminal 730 using infrared. The IR module 500 of the second terminal 730 converts the infrared of the request signal into an electrical signal and outputs the electrical signal. According to various embodiments of the present disclosure, the analog processor 600 of the second terminal 730 amplifies, filters, and compensates the electrical signal, and outputs an analog signal having no distortion and noise (or reduced distortion and noise), the level of which is equal to or larger than a predetermined level. According to various embodiments of the present disclosure, the IR module 500 and the analog processor maintain the operable state in which normal power is continuously supplied thereto even when the second terminal 730 is in the sleep mode.

According to various embodiments of the present disclosure, the digital processor 700 of the second terminal 730 performs a data conversion operation of converting the analog signal into digital data and determines whether the digital data is valid. If the digital data is valid as a result of the determination (e.g., in response to the digital valid being determined to be valid), then the digital processor 700 of the second terminal 730 generates an interrupt signal for activating an application program 800 which is in the freeze state of the sleep mode to be in an unfreeze state. The digital processor 700 of the second terminal 730 transmits all or a portion of digital data in a state in which the application program 800 is activated and the application program 800 identifies the digital data and immediately performs the IR pairing operation with the first terminal (Terminal 1) 710 which has transmitted the request signal (request #1) of the infrared.

For example, a guide message and a touch button for receiving an accept with respect to the IR pairing operation with the first terminal 710 from the user may be displayed on the second terminal (Terminal 2) 730 as illustrated in FIG. 7B. According to whether the user accepts the IR pairing operation (e.g., indicates acceptance in relation to the guide message), the IR pairing may be selectively performed. In contrast, the digital processor 700 of the second terminal 730 ignores the digital data when the digital data is determined not to be valid data (e.g., in response to the digital data being determined not to be valid data) and maintains the freeze state of the application program.

FIG. 9 is a diagram illustrating information for a transmitter-side electronic device according to an embodiment of the present disclosure.

Referring to FIG. 9, the digital data may include the identification information and performance information of the first terminal 710 which has transmitted the request signal (request #1). For example, the terminal information included in the digital data may include a device type, a manufacturer, version, a device identifier (ID), an error detection/correction, backhaul information of the terminal, and/or the like as illustrated in FIG. 9.

The device type, the manufacturer, the version, and the device ID may correspond to the identification information of the terminal and the error detection/correction and backhaul information may correspond to the performance information of the terminal. The terminal information may include various types of information additionally and unnecessary information thereof may be omitted. The digital processor 700 of the second terminal 730 identifies one or more of the device type, the manufacturer, the version, and the device ID of the first terminal and, if the first terminal 710 is a specific terminal having enough performance to perform IR pairing, then the second terminal 730 determines that the digital data is valid or, if the first terminal 710 is not the specific terminal, then the second terminal 730 determines that the digital data is not valid.

According to various embodiments of the present disclosure, the application program 800 identifies not only the device type, manufacturer, version, device ID of the first terminal but also error detection/correction and backhaul information and immediately performs IR pairing with the second terminal 730 or selectively performs IR pairing depending to a user's accept as illustrated in FIG. 7B. On the first terminal 710, a message notifying accept waiting state may be displayed for a predetermined time.

As illustrated in FIG. 8, a first terminal 810 and a second terminal 830 communicate with each other.

At operation 840, the first terminal 810 generates a request signal for performing IR pairing. The first terminal 810 transmits the request signal for IR pairing to the second terminal 830. The first terminal 810 may generate the request signal in response to a user input to the first terminal 810 requesting IR pairing.

At operation 850, the second terminal 820 performs data conversion. For example, in response to receiving the request signal from the first terminal 810, the second terminal 830 performs data conversion. As an example, the IR module 500 of the second terminal 830 converts the infrared of the request signal into an electrical signal and outputs the electrical signal. The second terminal 830 may convert the analog signal into digital data.

At operation 860, the second terminal 830 determines a validity of the data.

At operation 870, the second terminal 830 may wake up. The application on the second terminal 830 may activate and/or wakeup. For example, if the digital data is valid as a result of the determination (e.g., in response to the digital valid being determined to be valid), then the digital processor 700 of the second terminal 830 generates an interrupt signal for activating an application program 800 which is in the freeze state of the sleep mode to be in an unfreeze state. The digital processor 700 of the second terminal 830 transmits all or a portion of digital data in a state in which the application program 800 is activated and the application program 800 identifies the digital data and immediately performs the IR pairing operation with the first terminal (Terminal 1) 810 which has transmitted the request signal (request #1) of the infrared.

At operation 880, the second terminal 830 performs the IR pairing operation with the first terminal 810.

Figure 10:
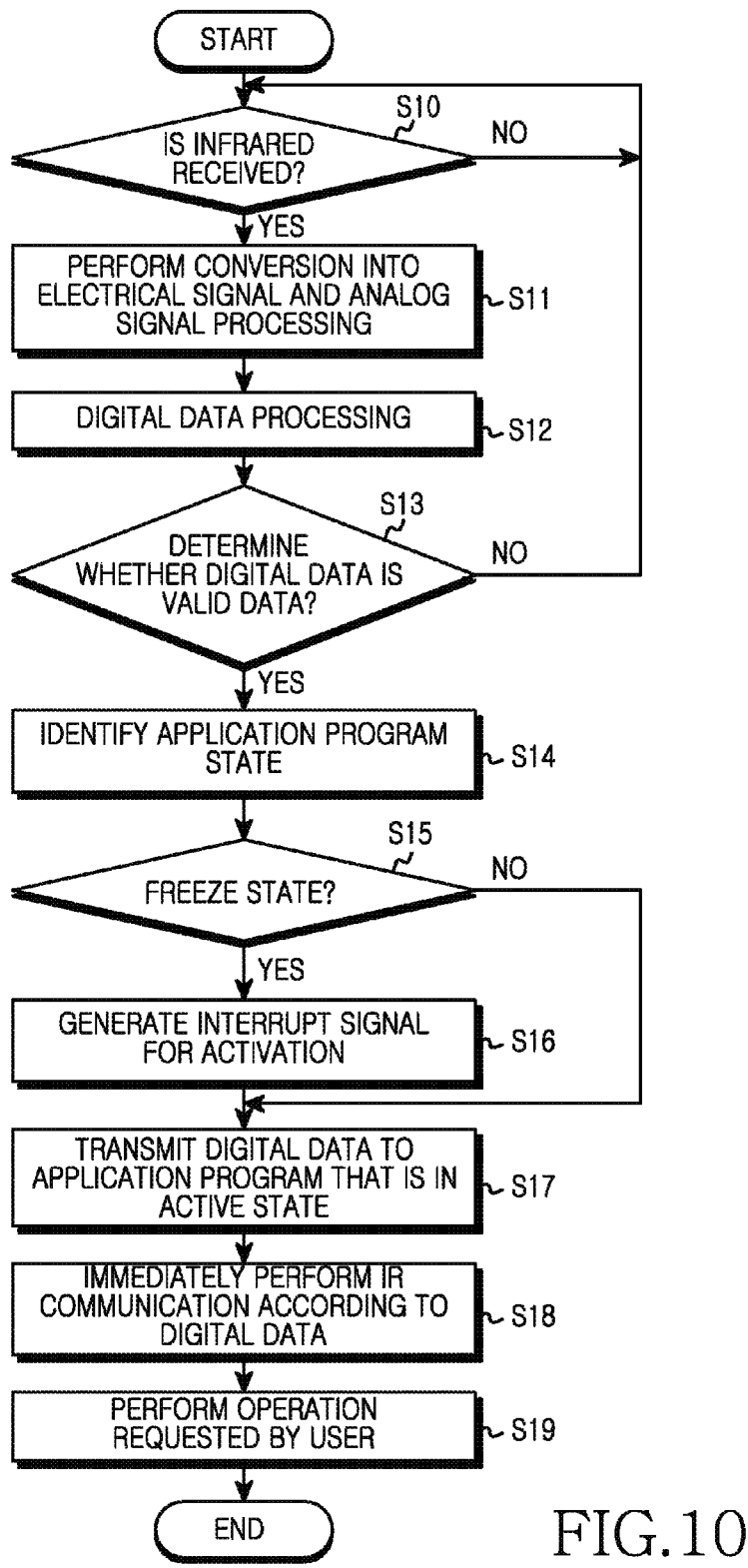
FIG. 10 is an operation flow chart of an IR communication method for an electronic device according to an embodiment of the present disclosure.

FIG. 10 is a diagram illustrating an operation flowchart for an IR communication method of an electronic device according to an embodiment of the present disclosure.

Figure 11A:
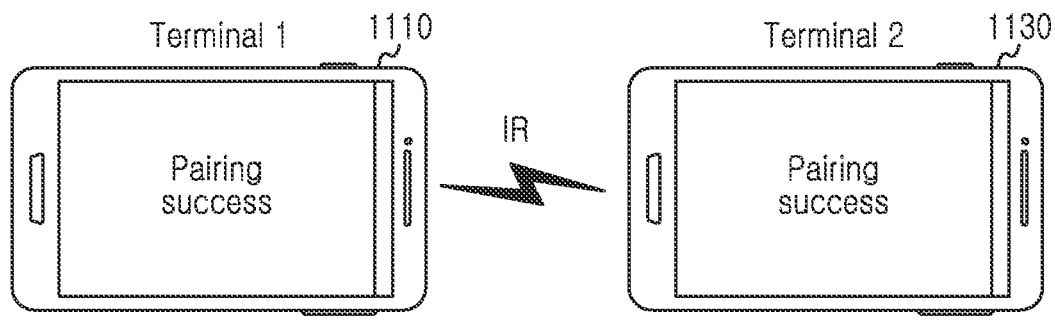
FIGS. 11A and 11B are display screens of an electronic device according to an embodiment of the present disclosure.
Figure 11B:
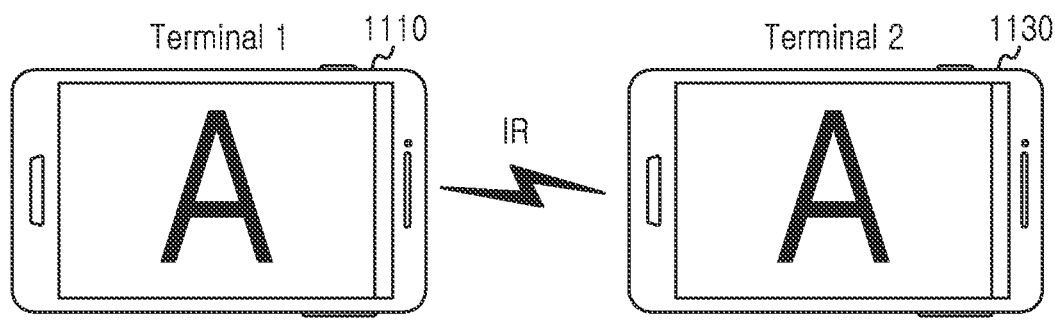

FIGS. 11A and 11B are display screens of an electronic device according to an embodiment of the present disclosure.

As described above with reference to FIG. 6, a terminal may be an electronic device, such as a smart phone or a tablet PC, which includes the IR module 500, the analog processor 600, the digital processor 700 and the application program 800.

The IR module 500 and the analog processor 600 of the terminal maintain an operable state in which normal power is continuously supplied even when the terminal is in a sleep mode for power saving.

At operation S10, the terminal determines whether an infrared signal is received.

If the terminal determines that an infrared signal is not received at operation S10, then the terminal may return to operation S10 at which the terminal continues to poll for reception (e.g., detection) of an infrared signal.

If infrared is received (e.g., through the photo detector 502 of the IR module 500) at operation S10, then the terminal proceeds to operation S11 at which the photo detector 502 converts the infrared into an electrical signal and outputs the same. The AMP 602 of the analog processor 600 amplifies the electrical signal to have a predetermined or more level of voltage. The filter 603 of the analog processor 600 removes noise components from the amplified electrical signal. The signal compensator 604 of the analog processor 600 performs an analog signal processing operation of compensating for distortion of the electrical signal from which the noise components are removed.

The digital processor 700 maintains a standby state in which low power is continuously supplied when the terminal is in the sleep mode for power saving. If the voltage level of the analog signal is equal to or larger than a predetermined level (e.g., in response to the voltage level of the analog signal being determined to be equal to or larger than a predetermined level), then the digital processor 700 performs switching from the standby mode to the active mode to be in an operable state in which normal power is continuously supplied. The digital converter 701 of the digital processor 700 converts the analog signal into digital data. For example, the digital converter 701 may be implemented using an ADC.

At operation S12, the digital converter 701 performs a digital processing operation of converting the analog signal into the digital data by using a frequency clock signal (e.g., 10 Hz) for the sleep mode.

At operation S13, the terminal determines whether the digital data is valid data. For example, the data processor 701 of the digital processor 700 determines whether the digital data is valid data. As described above with reference to FIG. 9, the digital data may include the identification information and performance information of a counterpart terminal that has requested IR communication. For example, the digital data may include the device type, manufacturer, version, device ID, error detection/correction and backhaul information of the terminal as illustrated as terminal information.

According to various embodiments of the present disclosure, the data processor 702 identifies one or more of the device type, manufacturer, version, and device ID of the counterpart terminal. When the counterpart terminal is a specific terminal having enough performance to perform IR pairing, determines that the digital data is valid or otherwise, determines that the digital data is not valid.

If the terminal determines that the digital data is not valid at operation S13, then the terminal may return to operation S10 at which the terminal polls for reception of an infrared signal.

In contrast, if the terminal determines that the digital data is valid at operation S13, and the terminal may proceed to operation S14 at which the application program state is identified. For example, the controller 703 of the digital processor 700 identifies the application program state. If the application program 800 is not in the freeze state, then the terminal does not generate the interrupt signal to wake up the application program 800.

At operation S15, the terminal determines whether the application program state is in a freeze state. For example, at operation S15, the controller 703 of the digital processor 700 identifies whether the application program 800 for IR communication is in the freeze state for power saving.

If the terminal determines that the application program state is in a freeze state at operation S15 (e.g., in response to determining that the application state is in a freeze state), then the terminal may proceed to operation S15 at which the terminal generates an interrupt signal for activation (e.g., of the application program 800). If the controller 703 of the digital processor 700 determines that the application program 800 is in the freeze state at operation S15, then at operation S16, the controller 703 generates the interrupt signal for activating the application program 800 to be in the unfreeze state. If the application program 800 is determined not to be in the freeze state, then the interrupt signal is not generated.

Thereafter, at operation S17, the terminal transmits digital data to the application program 800 that is in an active state. For example, at operation S17, controller 703 transmits the digital data to the application program that is in the active state. The interrupt signal and the digital data transmitted from the controller 703 are sequentially transmitted to the application program 800 at predetermined time intervals or are transmitted in one continuous data stream.

At operation S18, the application program 800 may immediately perform IR communication with the counterpart terminal that has transmitted infrared in response to the digital data transmitted from the controller 703 or selectively perform IR communication depending on the user's accept. For example, in response to transmission of the digital data to the application program that is in an active state, the terminal may perform IR communication with the counterpart terminal.

Thereafter, at operation S19, the application program 800 performs an operation requested by the user.

As illustrated in FIGS. 11A and 11B, the terminals (e.g., first terminal 1110 (Terminal 1) and second terminal 1130 (Terminal 2)), such as smart phone or tablet PC, may perform bidirectional IR communication between each other and IR communication with a terminal which is in a sleep mode may be performed rapidly and effectively.

According to the various embodiments of the present disclosure, bidirectional IR communication between electronic devices, such as smart phone or tablet PC may be performed immediately by a user's simple manipulation, thereby improving user convenience. In addition, when a transmitter electronic device transmits a request signal using infrared, a receiver electronic device which is in a sleep state performs switching to an activity state in response to the request signal and immediately perform IR communication with the transmitter electronic device, thereby effectively and rapidly performing bidirectional IR communication with the electronic device which is in the sleep mode.

The methods according to the various embodiments described in the claims or specification of the present disclosure may be implemented by hardware, software, or a combination thereof. If the methods are implemented by software, a non-transitory computer-readable storage medium may be provided to store one or more programs (software modules). The one or more programs stored in the non-transitory computer-readable storage medium may be configured for execution by one or more processors in an electronic device.

The one or more programs may include instructions for causing the electronic device to execute the methods according to the various embodiments of the present disclosure described in the claims and/or specification of the present disclosure. These programs (software modules or software) may be stored in RAMs, nonvolatile memories including flash memories, ROMs, EEPROMs, magnetic disc storage devices, CD-ROMs, DVDs, other types of optical storage devices, or magnetic cassettes.

In addition, the programs may be stored in a memory configured by a combination of some or all of such storage devices. In addition, each of the memories may be provided in plurality. In addition, the program may be stored in an attachable storage device that can access the electronic device via a communication network such as the Internet, an Intranet, a Local Area Network (LAN), a Wide LAN (WLAN), and a Storage Area Network (SAN), or a communication network configured in combination of them. The storage device may access the electronic device via an external port. In addition, a separate storage device on a communication network may access a mobile electronic device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in an electronic device, the method comprising:
    while the electronic device is operating in a sleep mode, wherein a display module is deactivated in the sleep mode:
        converting, by a receiver, infrared (IR) light signal received from another electronic device into an electrical signal,
        amplifying, by an analog processor, the electrical signal and outputting an analog signal,
        converting, by a digital processor, the analog signal into digital data, and
        determining, by the digital processor, whether the digital data is valid by identifying one or more of a device type, a manufacturer, a version, a device Identifier (ID) of the other electronic device, included in the digital data;
    in response to determining that the digital data is valid, activating the display module and an application program in a freeze state to be in an unfreeze state;
    generating a notification information indicating that a request for IR communication is received, wherein the notification comprises at least one of a vibration of the electronic device generated by using a motor, and a notification sound generated by a speaker;
    displaying, by the application program, graphical user interface (GUI) for receiving an accept with respect to performing IR communication with the other electronic device on a display; and
    in response to receiving an input for performing IR communication on the GUI, performing, by the application program, IR communication with the other electronic device using error detection/correction and backhaul information of the other electronic device, included in the digital data,
    wherein the receiver and the analog processor maintain an operable state when the electronic device operates in the sleep mode.

2. The method of claim 1, further comprising:
    in response to the digital data being determined not to be valid, ignoring the digital data and maintaining the application program in the freeze state; and
    in response to receiving an input for not performing IR communication on the GUI, deactivating the application program in the unfreeze state to be in the freeze state.

3. The method of claim 1, wherein the activating of the application program comprises:
    generating an interrupt signal in response to the digital data being determined to be valid, and
    activating the application program in the freeze state to be in the unfreeze state.

4. The method of claim 3, further comprising:
    transmitting the digital data to the application program after the generation of the interrupt signal.

5. The method of claim 1, wherein the IR light signal is received by a photo detector included in the receiver and the photo detector is configured in one package with an IR Light Emitting Diode (LED).

6. The method of claim 1, wherein the analog signal is converted into the digital data using a frequency clock signal for a sleep mode.

7. A non-transitory computer-readable storage medium storing a program, that when executed, causes at least one processor to perform the method of claim 1.

8. An electronic device comprising:
    a display configured to be deactivated when the electronic device is in a sleep mode;
    a receiver configured to:
        receive infrared (IR) light signal received from another electronic device, and
        perform conversion into an electrical signal;
    an analog processor configured to amplify the electrical signal and to output an analog signal; and a digital processor, while the electronic device is operating in the sleep mode, configured to:
> convert the analog signal into digital data, to determine whether the digital data is valid by identifying one or more of a device type, a manufacturer, a version, a device Identifier (ID) of the other electronic device, included in the digital data;
> activate the display and an application program in a freeze state to be in an unfreeze state;
> generate a notification information indicating that a request for IR communication is received, wherein the notification comprises at least one of a vibration of the electronic device generated by using a motor, and a notification sound generated by a speaker;
> display, by the application program, graphical user interface (GUI) for receiving an accept with respect to performing IR communication with the other electronic device on the display; and
> in response to receiving an input for performing IR communication on the GUI, perform IR, by the application program, communication with the other electronic device using error detection/correction and backhaul information of the other electronic device, included in the digital data, wherein the receiver and analog processor maintain an operable state when the electronic device operates in the sleep mode.

9. The electronic device of claim 8, wherein the digital processor is implemented using a Field Programmable Gate Array (FPGA) IC and maintains a standby state in which low power is continuously supplied when the electronic device is in a sleep mode.

10. The electronic device of claim 8, wherein the digital converter converts the analog signal into the digital data using a frequency clock signal for a sleep mode.

11. The electronic device of claim 8, wherein the data processor identifies one or more of a device type, a manufacturer, a version, and a device Identifier (ID) and determines whether the digital data is valid.

12. The electronic device of claim 8, wherein the digital processor transmits the digital data to the application program after generation of an interrupt signal.

13. The electronic device of claim 12, wherein the digital processor is further configured to:
> in response to the digital data being determined not to be valid, ignore the digital data and maintaining the application program in the freeze state; and
> in response to receiving an input for not performing IR communication on the GUI, deactivate the application program in the unfreeze state to be in the freeze state.

14. The electronic device of claim 8, wherein the receiver is a photo detector and the photo detector included in the receiver is configured in one package with an IR Light Emitting Diode (LED).

15. The electronic device of claim 8, wherein the analog processor comprises:
> an amplifier (AMP) configured to amplify a level of the electrical signal,
> a filter configured to remove noise of the electrical signal of which the level is amplified, and
> a compensator configured to compensate for distortion of the electrical signal from which noise is removed and to output the analog signal.

* * * * *